Dec. 23, 1952 — D. R. McNEAL — 2,622,613
PRESSURE CONTROL VALVE
Filed June 2, 1947
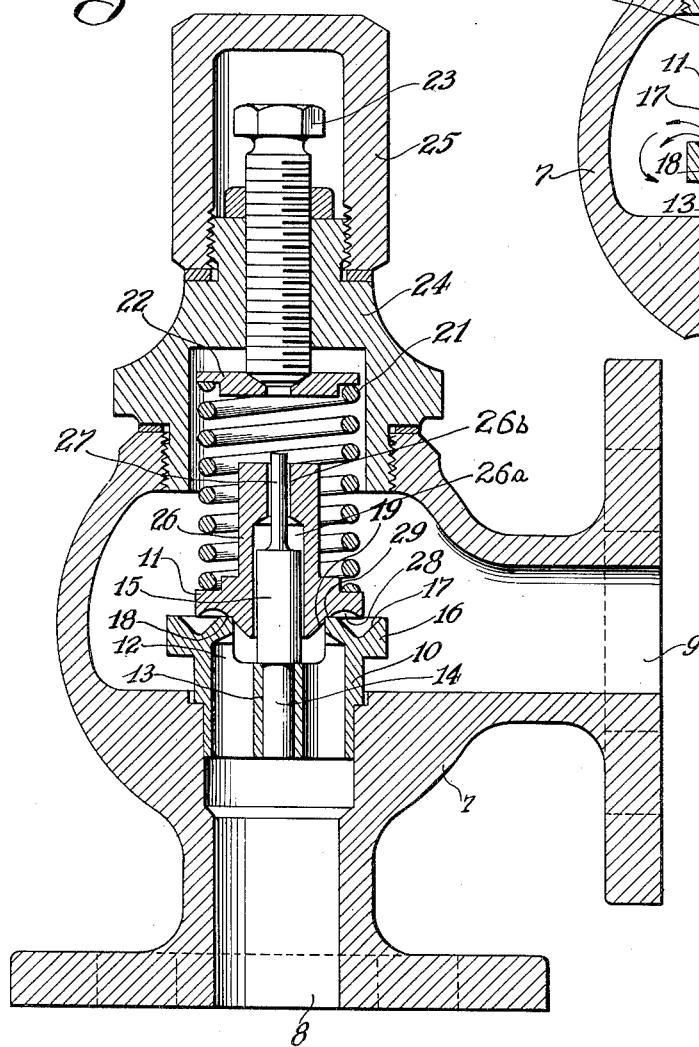
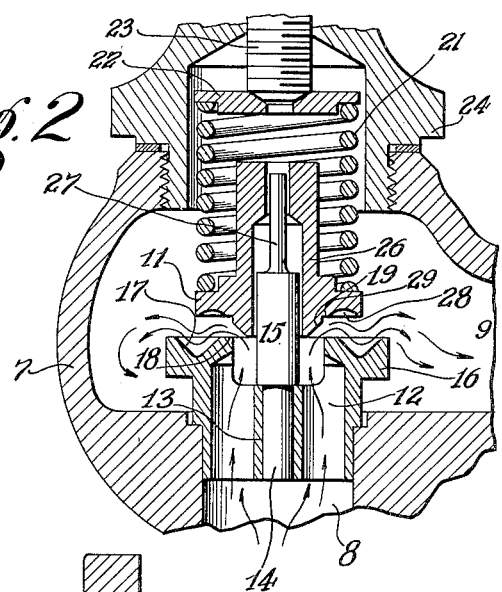
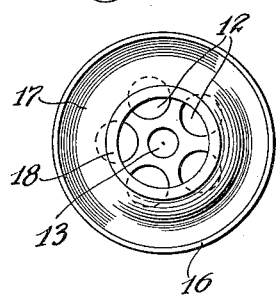
INVENTOR.
D. R. McNeal
BY Synnestvedt & Lechner
Attys Patented Dec. 23, 1952

2,622,613

UNITED STATES PATENT OFFICE 2,622,613

PRESSURE CONTROL VALVE

Daniel Raymond McNeal, Abington, Pa., assignor to Andale Company, Philadelphia, Pa., a corporation of Pennsylvania Application June 2, 1947, Serial No. 751,818

9 Claims. (Cl. 137—469)

This invention relates to pressure control valves and especially to pressure control valves of the spring-loaded lift type.

The primary object of the invention is to provide a valve of the type described which will open at a pressure much closer to the desired pressure and which, after it has opened, is capable of maintaining such pressure over a very much wider range of fluctuations in demand than has been possible with any device of this kind heretofore familiar to the art.

It is also an object of my invention to provide a construction of this kind which is extremely compact while, at the same time, providing for very much smoother operation of the valve.

Still another object of the invention is to provide a valve unit of the character described which can be readily applied to a wide variety of situations.

How the foregoing, together with such other objects as may appear hereinafter or are incident to my invention, are attained is illustrated in the accompanying drawings wherein—

Figure 1 is a longitudinal section through a spring-loaded lift type pressure control valve embodying my preferred type of construction, the parts being illustrated in the positions they assume when the valve is closed;

Figure 2 is a partial section like that of Figure 1 but illustrating the parts in open position; and Figure 3 is a plan view of the seat member of Figures 1 and 2.

Before proceeding to a detailed description of the several figures I wish to refer, by way of example, to a fluid system in which my valve is particularly useful. For instance, in the lubricating system of a modern turbine installation in which an oil actuated or oil relay governor is employed, the oil pump on the turbine is arranged to supply the oil not only for the bearings of the turbine but also for the operation of the relay gears and, in a great many cases, the oil for cooling the gears. The oil for all these purposes generally comes from a single source and the demand, obviously, will vary over a considerable range. My improved valve is particularly useful in such a situation and operates to maintain any desired pressure in a fluid delivery line over a wide range of fluctuations in demand on the supply line.

Referring to the drawings, it will be seen that I have illustrated a valve embodying a main body 7 having an inlet opening 8 and an outlet 9. The inlet opening 8 is adapted to be connected with the fluid supply line (not shown) but it will be understood that the demands on the supply line are subject to considerable variation and the principal object of my improved valve, as already described, is to maintain the pressure in such supply line at a substantially constant point over a wide fluctuation in demand. To this end the outlet 9 is open to atmospheric pressure and is connected to spill any oil which passes the valve back into the sump or reservoir of the system whenever necessary to keep the pressure from building up in the supply line to which the chamber 8 is connected. (It will be noted that my invention is being described in connection with its use in an oil supply system although it should be understood that the principles of the invention can be employed in systems involving other fluids.)

The valve proper consists of a seat member 10 and a spring-loaded disc member 11, the seat member being suitably fitted into the bore of the inlet passage 8 as shown in Figure 1 and the disc member being mounted so as to be capable of movement toward and away from the seat member. The seat member is formed with a series of longitudinally extending passages 12, the number of which may vary depending upon the size of the valve. In the present instance I have illustrated five of such passages and it will be noticed that they surround a central opening 13 into which is pressure fitted the stem 14 of a piston or pin member 15, the stem 14 being of lesser diameter than the main body portion 15.

The upper end of the seat member 10 is formed as an enlarged shoulder 16 in the upper face of which is an annular V-shaped trough or groove 17, the sloping sides of which groove are arranged, preferably, at an angle of 45° with respect to the vertical plane which bisects the trough. It will be seen, therefore, that the angle embraced between the sloping sides of the trough is equal to 90°. This is my preferred construction. To the inside of this groove or trough 17 the face of the member 10 is provided with an annular seating surface 18 which is made preferably of very slight transverse dimension, the illustration in this regard being somewhat exaggerated for the sake of clearness.

The valve disc member 11 is formed with a cone-shaped portion 19 which projects toward the seat member 10. The rear face of the disc member 11 is shouldered, as shown, to provide a bearing for the loading spring 21 which reacts between the disc portion and the plate member 22 which latter is swively carried at the inner end of the adjusting screw 23. The pressure of the spring 21, obviously, can be varied by turning the screw 23 into or out of the bonnet 24, the bonnet being screw threaded into the valve body 7 as shown. A cover or cap 25 is screw threaded to the top of the bonnet, also as shown.

Returning now to the valve disc member 11, it will be seen that on the side opposite to the cone 19 it is provided with a cylindrical stem portion 26 having a bore 26a adapted to cooperate with the piston or pin member 15, the parts being arranged, as shown, so that the member 15 projects centrally through the cone 19 and the disc 11. In this way the fluid coming from the inlet 8 is evenly distributed around the surface of the cone. A reduced end or stem 27 on the piston member 15 projects through a correspondingly reduced portion 26b of the cylinder member 26. The portion 15 and the stem 27 of the piston member have loose fits in the cooperating portions 26a and 26b of the cylinder member 26, the degree of looseness being sufficient to create a small annular passage or bypass which connects the inlet side 8 of the valve with the outlet side 9. Relative motion between the parts tends to keep this bypass from clogging so that it is always effective.

The inlet face of the disc member 11 is provided with an annular groove 28 which, in cross section, is formed preferably as an arc of a circle and the groove and the cone 19 are so formed and placed with respect to each other that the surface of the cone is tangent to the arc of the groove. Furthermore, the slope of the cone 19 is preferably arranged at an angle of 45° to the longitudinal axis of the valve.

Between the inner edge of the groove 28 and the base of the cone 19 I prefer to form a relatively small and shallow seating shoulder 29 which cooperates with the shoulder or seating surface 18 on the seat member 10. This seating shoulder 29 is not absolutely essential and, in fact, ideally considered, the best operating conditions would be established by having an edge contact between the seat member 10 and the cone 19, but it is not always possible to attain this in practice for the reason that under the movement of the valve there is a tendency to quickly cut or develop a small seat or shoulder in the face of the cone. For this reason, therefore, I prefer to pre-form the seating shoulders as described. In any event the shoulder should be kept to as small a dimension as possible in order to minimize any adverse effect which it may have on the flow of the fluid and the consequent smoothness of the operation of the valve.

At this point, attention is directed to the fact that the trough 17 is arranged in such relation to the groove 28 as to minimize to as great an extent as possible the creation of any turbulence in the flow of the fluid as it spreads over the cone 19, across the groove 28 and then into and out of the groove 17.

The method of operation no doubt will be obvious from the description. Nevertheless it will be briefly described under the assumption that it is desired to maintain a constant pressure of approximately 50 pounds per square inch in the inlet 8 and therefore in the supply line to which the inlet is connected. The spring 21 will be designed and its tension adjusted so as to just counter-balance this pressure. If the demands on the line to which the inlet chamber 8 is connected are relatively small the pressure, of course, will tend to rise since the source from which the fluid comes remains relatively constant. As soon as the pressure goes slightly above 50 pounds the valve disc member 11 will leave its seat and the fluid will escape past the seating shoulders 18 and 29 and flow into the groove 28 in a direction which is determined by the angularity of the sloping face of the cone 19. As it leaves the groove 28 the line of flow will be at approximately the same angle as that at which it entered. After it leaves the groove the fluid enters the trough 17 which, as described, is arranged so as to minimize any turbulence in the flow. In this way the full effect of the hydrokinetic force of the fluid will be made available for holding the valve in its open position. This smoothness of operation is greatly helped by making the slope of the cone 19 tangent or substantially tangent to the arc of the groove 28 and, preferably, also by using a slope of approximately 45° from the longitudinal axis for the face of the cone. It is also helped by employing the relatively small seating portions 18 and 29 and locating them at the base of the cone adjacent to the inlet edge of the groove 28.

Smoothness of flow is still further promoted by the use of the plurality of inlet passages 12 which act like a grid or sieve to iron out irregularities or unevenness in the flow. Furthermore, by making the piston member 15 rigid with the seat member 10, as shown, the piston performs the function of a centering pin so that all of the parts which cooperate in attaining smoothness of flow are maintained in fixed concentric relationship under all service conditions.

The small passage which is created by virtue of the loose fit of the plunger member 15—27 in the cylinder member 26 constitutes, in effect, a bypass from the inlet chamber to the outlet chamber which permits a constant flow of fluid of relatively small volume through the interior of the valve which is still another factor in securing smoothness of operation. The difference in flow capacity between the smaller portion 26b of this passage and the larger portion 26a tends to build up a back pressure in the portion 26a above the piston 15 and this serves as a "snubber" to cushion the operation.

The cooperative arrangement of the parts involved, namely, of the holes 12, the cone 19, the groove 28, the trough 17 and the piston and cylinder structure 15, 27, 26a and 26b, serves to provide for a very quick response to any changes in the hydrokinetic force which makes for great sensitiveness as well as evenness of operation without "hunting" or "banging." In fact, any tendency for the valve to flutter is substantially completely eliminated.

From the outlet chamber 9 of the valve the fluid can be spilled at atmospheric pressure to the sump or reservoir of the system or, if desired, could even be discharged to waste, although in the case of lubricating systems such discharge to waste would, of course, be extremely wasteful and expensive. On the other hand, if the fluid involved is water, it might well be quite unnecessary to collect the spillage for recirculation.

With my improved construction I find that it is possible not only to effect opening of the valve at a point much closer to the pressure desired than has heretofore been possible but also to maintain a substantially constant pressure over an unusually wide range of fluctuations in demand. Just by way of example, with a ¾" valve my improved construction makes it possible to maintain a substantially constant pressure of approximately 50 pounds over a range of from 10 to almost 40 gallons of fluid per minute. Naturally this will vary with valves of different sizes and will be dependent also upon the viscosity of the fluid, the curvature of the groove 28, the slope of the cone 19, the relative size of the valve seating shoulders 18 and 29, the capacity of the by-pass through the valve, etc., but if the preferred relationships illustrated and described herein are adopted only a little experimentation will be required to adjust these various factors so as to give optimum results under any particular set of conditions. For example, the depth of the groove 28 will have to be varied slightly depending upon the viscosity of the fluid being handled but I have found that best results are to be obtained if the slope of the cone is made tangent to the groove, regardless of the depth of the groove, and if the seating shoulders are kept relatively small and are located preferably just at the point where the face of the cone meets the inner edge of the groove. It is also advisable, as stated before, to slope the cone at approximately 45°. Some departures from these requirements are, of course, possible but they will generally be made only at the expense of maximum smoothness and efficiency in operation.

I claim:

1. In a liquid pressure control valve of the lift type having an inlet and an outlet passageway, the combination of an annular valve seat member embracing the inlet passageway, a cooperating annular valve member having a cone-shaped face presented toward said inlet passageway, an annular groove on the valve member surrounding the base of the cone, means yieldingly urging the valve member toward the seat member, a cylinder and piston device one member of which moves with the valve member, and a relatively small capacity continuously open channel by-passing the seat member and the valve member, which by-pass channel extends through said cylinder and piston device to connect the inlet side with the outlet side.

2. A valve in accordance with claim 1 but having in addition an annular trough facing the valve member and surrounding the inlet passage and disposed so that the base of the trough approximately opposes the outer edge of the annular groove on the valve member.

3. A valve in accordance with claim 2 wherein the sides of the trough slope at angles of 45° with respect to the vertical plane which bisects the trough.

4. A valve in accordance with claim 1 wherein the cylinder is on the back of the valve member and the piston is fixed to the seat member and projects through the valve member and the cylinder member.

5. The valve of claim 1 wherein the bypass is provided by loosely fitting the piston in the valve member and in the cylinder.

6. The valve of claim 1 in which the face of the cone is tangent to the curve of the groove.

7. The valve of claim 1 in which the face of the cone is tangent to the curve of the groove and in which the slope of the cone is at 45° with respect to the axis of the valve.

8. A valve in accordance with claim 1 wherein the face of the cone is tangent to the curve of the groove and wherein the slope of the cone is at 45° with respect to the axis of the valve member and, still further, wherein an annular trough is provided facing the valve member and surrounding the inlet passage with the sides thereof sloping at angles of 45° with respect to the vertical plane which bisects the trough, said trough being disposed so that the base thereof approximately opposes the outer edge of the annular groove on the valve member.

9. A valve in accordance with claim 1 wherein the annular valve seat member is formed to provide a plurality of individual, annularly arranged passageways for the incoming liquid.

DANIEL RAYMOND McNEAL.

REFERENCES CITED

The following references are of record in the file of this patent:

UNITED STATES PATENTS

| Number | Name | Date |
| --- | --- | --- |
| 190,884 | Maurel | May 15, 1877 |
| 342,267 | Richardson | May 18, 1886 |
| 538,703 | Schreidt | May 7, 1895 |
| 1,036,387 | Wainwright | Aug. 20, 1912 |
| 1,200,875 | Roy | Oct. 10, 1916 |